(12) United States Patent
Zhu et al.

(10) Patent No.: US 12,542,690 B2
(45) Date of Patent: Feb. 3, 2026

(54) MESSAGE HEADER PROCESSING METHOD AND APPARATUS, STORAGE MEDIUM AND ELECTRONIC DEVICE

(71) Applicant: ZTE Corporation, Shenzhen (CN)

(72) Inventors: Xiaolong Zhu, Shenzhen (CN); Zheng Zhang, Shenzhen (CN); Jun Feng, Shenzhen (CN); Yong Chen, Shenzhen (CN); Rusheng Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 444 days.

(21) Appl. No.: 18/022,378

(22) PCT Filed: Jun. 4, 2021

(86) PCT No.: PCT/CN2021/098409
§ 371 (c)(1),
(2) Date: Feb. 21, 2023

(87) PCT Pub. No.: WO2022/041916
PCT Pub. Date: Mar. 3, 2022

(65) Prior Publication Data
US 2023/0370298 A1    Nov. 16, 2023

(30) Foreign Application Priority Data
Aug. 31, 2020  (CN) .......................... 202010899306.0

(51) Int. Cl.
*H04L 12/18*   (2006.01)
*H04L 45/00*   (2022.01)
*H04L 45/745*  (2022.01)

(52) U.S. Cl.
CPC .......... *H04L 12/1886* (2013.01); *H04L 45/72* (2013.01); *H04L 45/745* (2013.01); *H04L 2212/00* (2013.01)

(58) Field of Classification Search
None
See application file for complete search history.

(56) References Cited

U.S. PATENT DOCUMENTS 11,431,615 B2 *  8/2022  Xie ......................... H04L 45/16
11,949,585 B2 *  4/2024  Xie ......................... H04L 45/24
(Continued)

FOREIGN PATENT DOCUMENTS

CN    106656524 A    5/2017
CN    107623630 A    1/2018
(Continued)

OTHER PUBLICATIONS

International Search Report for corresponding application PCT/CN2021/098409 filed Jun. 4, 2021; Mail date Aug. 27, 2021.
(Continued)

*Primary Examiner* — Chirag G Shah
*Assistant Examiner* — Benjamin Peter Welte
(74) *Attorney, Agent, or Firm* — CANTOR COLBURN LLP

(57) ABSTRACT

Embodiments of the present disclosure provide a method and apparatus for processing a message header, a storage medium, and an electronic apparatus. The method comprises: processing fields in an IPv6 message header according to fields in a Bit Indexed Explicit Replication (BIER) message header by using at least one of the following manners: the BIER message header is taken as a type of a Routing extension header of the IPv6 message header, and a Segments Left field in the IPv6 message header is processed according to a predefined manner; the BIER message header is taken as a type of other extension headers of the IPv6 message header, wherein the types of the other extension headers include a new option as a Hop-by-Hop extension header; a Bit-Forwarding Router Prefix (BFR-Prefix) of
(Continued)

Take a Bit Indexed Explicit Replication (BIER) message header as a type of a Routing extension header of an IPv6 message header, and process a Segments Left field in the IPv6 message header according to a predefined manner; take the BIER message header as a type of other extension headers of the IPv6 message header, wherein the types of the other extension headers include a new option as a Hop-by-Hop extension header; fill a Bit-Forwarding Router Prefix (BFR-Prefix) of the BIER message header in a Source Address (SA) field of the IPv6 message header; and embed a Bit Index Forwarding Table Index (BIFT-ID) field in the BIER message header into a target field of the IPv6 message header ⟋ S202 the BIER message header is filled in a Source Address (SA) field of the IPv6 message header; and a Bit Index Forwarding Table Index (BIFT-ID) field in the BIER message header is embedded into a target field of the IPv6 message header. The method solves the problems in the related art such as optimization cannot be effectively achieved in a process of combined encapsulation of a BIER message and an IPv6 message.

12 Claims, 3 Drawing Sheets

(56) References Cited

U.S. PATENT DOCUMENTS

| | | | |
|---|---|---|---|
| 11,991,012 B2* | 5/2024 | Xie | H04L 45/34 |
| 2018/0091473 A1 | 3/2018 | Wijnands | |
| 2019/0356590 A1 | 11/2019 | Bosch et al. | |
| 2020/0119991 A1 | 4/2020 | Dutta | |
| 2020/0244758 A1* | 7/2020 | Enguehard | H04L 67/5682 |
| 2022/0109623 A1* | 4/2022 | Xie | H04L 45/741 |
| 2022/0263751 A1* | 8/2022 | Liu | H04L 45/64 |

FOREIGN PATENT DOCUMENTS

| | | |
|---|---|---|
| CN | 109756425 A | 5/2019 |
| CN | 110417657 A | 11/2019 |
| CN | 110784411 A | 2/2020 |
| CN | 111147383 A | 5/2020 |
| WO | 2016188501 A1 | 12/2016 |
| WO | 2016198016 A2 | 12/2016 |
| WO | 2016198017 A1 | 12/2016 |

OTHER PUBLICATIONS

Chinese Office Action for corresponding application 202010899306.0 dated Dec. 5, 2024.
Constrained-Cast: Source-Routed Multicast for RPL draft-ietf-roll-ccast, O. Bergmann, Internet, https://www.ietf.org/archive/id/draft-ietf-roll-ccast-00.txt, Sep. 11, 2017.
E. Rosen, Multicast Using Bit Index Explicit Replication (BIER), Apr. 2018.
Encapsulation for Bit Index Explicit Replication (BIER) in MPLS and Non-MPLS Networks, Wijnands, et al., Jan. 2018.
European Search Report for corresponding application EP21 85 9760, Dated Dec. 8, 2023.
IJ Wijnands, Multicast Using Bit Index Explicit Replication (BIER), Nov. 2017.

* cited by examiner

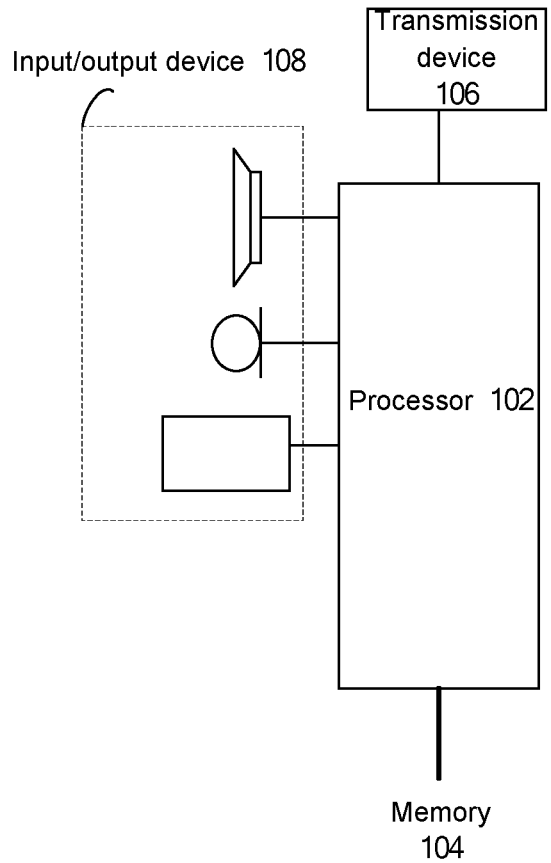

Fig. 1

Take a Bit Indexed Explicit Replication (BIER) message header as a type of a Routing extension header of an IPv6 message header, and process a Segments Left field in the IPv6 message header according to a predefined manner; take the BIER message header as a type of other extension headers of the IPv6 message header, wherein the types of the other extension headers include a new option as a Hop-by-Hop extension header; fill a Bit-Forwarding Router Prefix (BFR-Prefix) of the BIER message header in a Source Address (SA) field of the IPv6 message header; and embed a Bit Index Forwarding Table Index (BIFT-ID) field in the BIER message header into a target field of the IPv6 message header ⟶ S202

Fig. 2

| 1 2 3 4 | 5 6 7 8 | 1 2 3 4 | 5 6 7 8 | 1 2 3 4 5 6 7 8 | 1 2 3 4 5 6 7 8 |
|---|---|---|---|---|---|
| Version | Traffic Class | | Flow Label | | |
| Payload Length | | | | NH = 43 | Hop Limit |
| Source Address | | | | | |
| Destination Address | | | | | |
| Next Header | | Hdr Ext Len | | Routing Type =(BIER) | Segments Left |
| BIFT-id | | | | TC · S | TTL |
| Nibble | Ver | BSL | | Entropy | |
| OAM | Rev | DSCP | Proto | BFIR-id | |
| BitString(first 32 bits) | | | | | |
| ... | | | | | |
| BitString(last 32 bits) | | | | | |
| Inner Multicast Packet | | | | | |

Fig. 3

| Type | Length | Value |
|---|---|---|

Fig. 4

MESSAGE HEADER PROCESSING METHOD AND APPARATUS, STORAGE MEDIUM AND ELECTRONIC DEVICE

CROSS-REFERENCE TO RELATED APPLICATION

The present disclosure is a National Stage Filing of the PCT International Application No. PCT/CN2021/098409 filed on Jun. 4, 2021, which claims priority to Chinese Patent Application No. 202010899306.0, filed to the China National Intellectual Property Administration on Aug. 31, 2020, the disclosure of which is hereby incorporated by reference in its entirety.

TECHNICAL FIELD

Embodiments of the present disclosure relate to the field of communications, and in particular, to a method and apparatus for processing a message header, a storage medium, and an electronic apparatus.

BACKGROUND

Internet Protocol Version 6 (IPv6 for short) is a next-generation IP protocol designed by the Internet Engineering Task Force (IETF for short) and is used for replacing IPv4. The use of IPv6 can not only solve the problem of the number of network address resources, but also solve the obstacle of multiple access devices being connected to the Internet.

Bit Indexed Explicit Replication (BIER for short) (RFC8279) is a novel multicast data forwarding technology, nodes at a network edge are each represented by only one bit, multicast traffic is transmitted in an intermediate network, and a specific BIER message header is additionally packaged; the message header marks all destination nodes of the multicast traffic in the form of bit strings, and an intermediate network forwarding node performs routing according to the bit, thereby guaranteeing that the traffic can be sent to all the destination nodes. By means of a routing protocol, such as an Open Shortest Path First (OSPF for short) protocol and an Intermediate System-to-Intermediate System (ISIS for short) protocol in a three-layer network, an intermediate node forwarding device forms a Bit Index Forwarding Table (BIFT for short) in advance for guiding BIER forwarding, and completes forwarding of the message to the destination nodes according to the BIFT when receiving traffic for encapsulating the BIER message header. Such a data plane forwarding technology, i.e. BIER does not relate to the issue of establishing a multicast tree, thereby eliminating the time delay due to establishing a multicast tree; and when a link or node problem occurs in the network, the rate of convergence is the same as that of the OSPF or ISIS protocol, which reduces a huge time delay compared with the original multicast tree reestablishment.

During transmission, the BIER technology only needs to encapsulate certain multicast traffic in a BIER message as a payload for transmission. For an ingress device Bit-Forwarding Ingress Router (BFIR) in a BIER domain, it is necessary to know which egress devices Bit-Forwarding Egress Routers (BFERs) of a BIER domain require the multicast traffic, and in this way, only after receiving the multicast traffic, can the BFERs forward the multicast traffic to multicast receivers which need to receive the multicast traffic and are outside the BIER domain. The BIER technology can be directly encapsulated in an Ethernet message for transmission (protocol number 0xAB37), and when certain nodes cannot support direct identification of an Ethernet BIER message, if the Ethernet message is still used for transmission, nodes which cannot correctly identify the message will become black holes and discard the message.

Aiming at the problem in the related art of how to perform optimization in a process of combined encapsulation of a BIER message and an IPv6 message, no effective solution has been proposed.

SUMMARY

Embodiments of the present disclosure provide a method and apparatus for processing a message header, a storage medium, and an electronic apparatus, in order to at least solve the problem in the related art that the technical solution of how to perform optimization in a process of combined encapsulation of a BIER message and an IPv6 message has not been provided yet.

According to some embodiments of the present disclosure, a method for processing a message header is provided, the method includes: fields in an IPv6 message header are processed according to fields in a BIER message header by using at least one of the following manners: the BIER message header is taken as a type of a Routing extension header of the IPv6 message header, and a Segments Left field in the IPv6 message header is processed according to a predefined manner; the BIER message header is taken as a type of other extension headers of the IPv6 message header, wherein the types of the other extension headers include an option as a Hop-by-Hop extension header; a Bit-Forwarding Router Prefix (BFR-Prefix) of the BIER message header is filled in a Source Address (SA) field of the IPv6 message header; and a Bit Index Forwarding Table Index (BIFT-ID) field in the BIER message header is embedded into a target field of the IPv6 message header.

In some exemplary embodiments, the step that a Segments Left field in the IPv6 message header is processed according to a predefined manner, at least includes one of: the Segments Left field is set as a target value, so that all nodes ignore processing on the Segments Left field; a Segments Left field value of a BFIR is set as 255, when an intermediate node forwards a message hop by hop, a process of subtracting 1 is performed on the field value, and when the field value is 0, it indicates that a loop occurs in the message forwarding process; the BFIR sets a Segments Left field value of an ingress node as a maximum hop count reaching an edge device, when an intermediate node forwards a message hop by hop, a process of subtracting 1 is performed on the field value, and when the field value is 0, it indicates that a loop occurs in the message forwarding process; the Segments Left field value of the BFIR is set as 255, when the intermediate node forwards a message hop by hop, a process of subtracting 1 is performed on the field value, and when an IPv6 message of which the Segments Left field value is 255 reaches a BFER, the number of hops that the IPv6 message passes through is calculated according to the current Segments Left field value; and the Segments Left field is set as a maximum border value of a border to be passed through by the IPv6 message, and when passing through the border, a process of subtracting 1 is performed on the field value, and when the field value is 0, it indicates that the message reaches the maximum border and cannot continue to be forwarded to a next area any more.

In some exemplary embodiments, after the BIER message header is taken as the type of a Routing extension header of the IPv6 message header, and a Segments Left field in the IPv6 message header is processed according to a predefined manner, the method further includes: a control plane advertises support of each node itself for taking the BIER message header as the type of a Routing extension header of the IPv6 message header.

In some exemplary embodiments, the method further includes: support of each node itself for taking the BIER message header as the type of a Routing extension header of the IPv6 message header is advertised by using one of the following manners: advertisement is performed in a TLV manner, the support is carried in BIER information in an Interior Gateway Protocol (IGP) for advertisement, and the support is carried in BIER information in a Border Gateway Protocol (BGP) for advertisement.

In some exemplary embodiments, the method further includes: when the support of each node itself for taking the BIER message header as the type of a Routing extension header of the IPv6 message header is set under notification of a BFR-Prefix or a Bit-Forwarding Router Identifier (BFR-ID), advertisement is performed in a sub-TLV or sub-sub-TLV manner.

In some exemplary embodiments, before a BFR-Prefix of the BIER message header is filled in a SA field of the IPv6 message header, the method further includes: in cases where a node incapable of guaranteeing the transfer capability of the SA field in the IPv6 message header exists in all the nodes, the control plane advertises and collects information of the transfer capability of the SA fields in the IPv6 message headers of all the nodes.

In some exemplary embodiments, after a BFR-Prefix of the BIER message header is filled in a SA field of the IPv6 message header, the method further includes: when it is confirmed that the guarantee capability of the SA field in the IPv6 message header is not supported, N bits of other unused fields in the IPv6 message header are set to 1, in order to indicate that the SA of the IPv6 message header needs to be subjected to guarantee processing, where the value of N is not less than 1.

In some exemplary embodiments, before a BIFT-ID field in the BIER message header is embedded into a target field of the IPv6 message header, the method further includes: an address in the IPv6 message is modified, in order to set a routable prefix of the IPv6 message in first target number of bits in the IPv6 message.

In some exemplary embodiments, after an address in the IPv6 message is modified, the method further includes: the BIFT-ID field is embedded into a Destination Address (DA) in the IPv6 message; or the BIFT-ID field is embedded into the SA of the IPv6 message; or the BIFT-ID is filled in a Flow Label field of the IPv6 message header, and the DA and the SA in the IPv6 message are not modified.

In some exemplary embodiments, the method further includes: a forwarding table entry positioning operation of the BIFT-ID in the BIER message header is moved forward and is performed in the IPv6 message.

In some exemplary embodiments, the method further includes: a FUNCTION field of BIER table entry lookup is represented by a specific bit in the IPv6 message address.

According to some other embodiments of the present disclosure, an apparatus for processing a message header is also provided, the apparatus includes: a processing module, configured to process fields in an IPv6 message header according to fields in a BIER message header by using at least one of the following manners: the BIER message header is taken as the type of a Routing extension header of the IPv6 message header, and a Segments Left field in the IPv6 message header is processed according to a predefined manner; the BIER message header is taken as the types of other extension headers of the IPv6 message header, wherein the types of the other extension headers include an option as a Hop-by-Hop extension header; a BFR-Prefix of the BIER message header is filled in a SA field of the IPv6 message header; and a BIFT-ID field in the BIER message header is embedded into a target field of the IPv6 message header.

In some exemplary embodiments, the processing module is further configured to process a Segments Left field in the IPv6 message header according to a predefined manner, which at least includes one of: the Segments Left field is set as a target value, so that all nodes ignore processing on the Segments Left field; a Segments Left field value of a BFIR is set as 255, when an intermediate node forwards a message hop by hop, a process of subtracting 1 is performed on the field value, and when the field value is 0, it indicates that a loop occurs in the message forwarding process; the BFIR sets a Segments Left field value of an ingress node as a maximum hop count reaching an edge device, when an intermediate node forwards a message hop by hop, a process of subtracting 1 is performed on the field value, and when the field value is 0, it indicates that a loop occurs in the message forwarding process; the Segments Left field value of the BFIR is set as 255, when the intermediate node forwards a message hop by hop, a process of subtracting 1 is performed on the field value, and when an IPv6 message of which the Segments Left field value is 255 reaches a BFER, the number of hops that the IPv6 message passes through is calculated according to the current Segments Left field value; and the Segments Left field is set as a maximum border value of a border to be passed through by the IPv6 message, and when passing through the border, a process of subtracting 1 is performed on the field value, and when the field value is 0, it indicates that the message reaches the maximum border and cannot continue to be forwarded to a next area any more.

In some exemplary embodiments, the apparatus further includes: an advertisement module, configured to advertise, by a control plane, support of each node itself for taking the BIER message header as the type of a Routing extension header of the IPv6 message header.

In some exemplary embodiments, the advertisement module is further configured to advertise support of each node itself for taking the BIER message header as the type of a Routing extension header of the IPv6 message header by using one of the following manners: advertisement is performed in a TLV manner, the support is carried in BIER information in an IGP for advertisement, and the support is carried in BIER information in a BGP for advertisement.

In some exemplary embodiments, the advertisement module is further configured to perform advertisement in a sub-TLV or sub-sub-TLV manner when the support of each node itself for taking the BIER message header as the type of a Routing extension header of the IPv6 message header is set under notification of a BFR-Prefix or a BFR-ID.

In some exemplary embodiments, the apparatus further includes: a guarantee module, configured to advertise and collect, by the control plane, information of the transfer capability of the SA fields in the IPv6 message headers of all the nodes in cases where a node incapable of guaranteeing the transfer capability of the SA field in the IPv6 message header exists in all the nodes.

In some exemplary embodiments, the apparatus further includes: a determination module, configured to set N bits of other unused fields in the IPv6 message header to 1 when it is confirmed that the guarantee capability of the SA field in the IPv6 message header is not supported, in order to indicate that the SA of the IPv6 message header needs to be subjected to guarantee processing, where the value of N is not less than 1.

In some exemplary embodiments, the apparatus further includes: a modification module, configured to modify an address in the IPv6 message, in order to set a routable prefix of the IPv6 message in first target number of bits in the IPv6 message.

In some exemplary embodiments, the modification module is further configured to embed the BIFT-ID field into a DA in the IPv6 message; or embed the BIFT-ID field into the SA of the IPv6 message; or fill the BIFT-ID in a Flow Label field of the IPv6 message header, and not modify the DA and the SA in the IPv6 message.

In some exemplary embodiments, the modification module is further configured to move forward a forwarding table entry positioning operation of the BIFT-ID in the BIER message header and perform same in the IPv6 message.

In some exemplary embodiments, the modification module is further configured to represent a FUNCTION field of BIER table entry lookup by a specific bit in the IPv6 message address.

According to still some other embodiments of the present disclosure, a computer-readable storage medium is further provided, the computer-readable storage medium stores a computer program, wherein the computer program is configured to execute the steps in any one of the method embodiments when running.

According to still some other embodiments of the present disclosure, an electronic apparatus is further provided, and the electronic apparatus includes a memory and a processor; wherein the memory stores a computer program, and the processor is configured to run the computer program to execute the steps in any one of the method embodiments.

By means of the present disclosure, a BIER message and an IPv6 message can be processed as follows: fields in an IPv6 message header are processed according to fields in a BIER message header by using at least one of the following manners: the BIER message header is taken as the type of a Routing extension header of the IPv6 message header, and a Segments Left field in the IPv6 message header is processed according to a predefined manner; the BIER message header is taken as the types of other extension headers of the IPv6 message header, wherein the types of the other extension headers include a new option as a Hop-by-Hop extension header; a BFR-Prefix of the BIER message header is filled in a SA field of the IPv6 message header; and a BIFT-ID field in the BIER message header is embedded into a target field of the IPv6 message header, thereby combining BIER message encapsulation with IPv6 message encapsulation, optimizing message encapsulation and processing flow without affecting functions at all, and increasing the forwarding efficiency; and by means of the technical solutions, the problems in the related art such as optimization cannot be effectively achieved in a process of combined encapsulation of a BIER message and an IPv6 message are solved.

BRIEF DESCRIPTION OF THE DRAWINGS

FIG. 1 is a structural block diagram of hardware of a computer terminal for a method for processing a message header according to embodiments of the present disclosure;

FIG. 2 is a flowchart of a method for processing a message header according to embodiments of the present disclosure;

FIG. 3 is a schematic diagram in which a BIER message is encapsulated in an IPv6 message according to embodiments of the present disclosure;

FIG. 4 is a schematic diagram of TLV according to embodiments of the present disclosure;

DETAILED DESCRIPTION OF THE EMBODIMENTS

Figure 5:
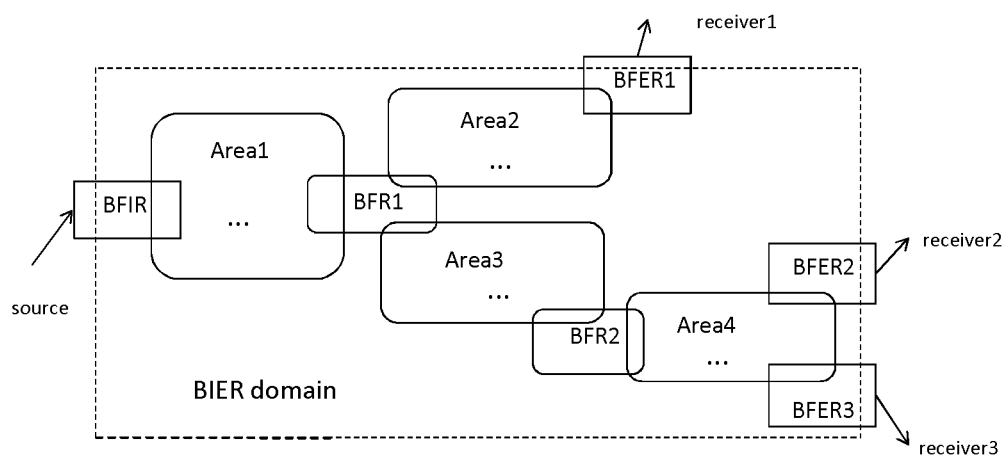
FIG. 5 is a schematic diagram of a message transmission mechanism applied in a BIER domain according to embodiments of the present disclosure.

Hereinafter, embodiments of the present disclosure are described in detail with reference to the accompanying drawings and in conjunction with the embodiments.

It should be noted that terms "first", "second" etc. in the description, claims, and accompanying drawings of the present disclosure are used to distinguish similar objects, and are not necessarily used to describe a specific sequence or order.

Method embodiments provided in embodiments of the present disclosure may be executed in a computer terminal or similar computing apparatuses. Taking running on a computer terminal as an example, FIG. 1 is a structural block diagram of hardware of a computer terminal for a method for processing a message header according to embodiments of the present disclosure. As shown in FIG. 1, the computer terminal may include one or more (FIG. 1 shows only one) processors 102 (the processors 102 may include, but are not limited to a processing apparatus such as a microprocessor MCU or a programmable logic device FPGA) and a memory 104 configured to store data, wherein the computer terminal can further include a transmission device 106 and an input/output device 108 for communication functions. A person of ordinary skill in the art would understand that the structure shown in FIG. 1 is merely exemplary, and does not limit the structure of the computer terminal. For example, the computer terminal may also include more or fewer assemblies than those shown in FIG. 1, or have different configurations from that shown in FIG. 1.

The memory 104 may be configured to store a computer program, for example, a software program and module of application software, such as a computer program corresponding to the method for processing a message header in the embodiments of the present disclosure; and the processor 102 executes various functional applications and data processing by running the computer program stored in the memory 104, i.e. implementing the described method. The memory 104 may include a high-speed random access memory, and may also include a non-transitory memory, such as one or more magnetic storage apparatuses, flash memories or other non-transitory solid-state memories. In some instances, the memory 104 may further include memories remotely arranged with respect to the processor 102, and these remote memories may be connected to the computer terminal via a network. Examples of the network include, but are not limited to the Internet, an intranet, a local area network, a mobile communication network and combinations thereof.

The transmission device 106 is configured to receive or send data via a network. Specific examples of the network may include a wireless network provided by a communication provider of the computer terminal. In one example, the transmission device 106 includes a Network Interface Controller (NIC for short) which may be connected to other network devices by means of a base station, thereby being able to communicate with the Internet. In one example, the transmission device 106 may be a Radio Frequency (RF for short) module which is configured to communicate with the Internet in a wireless manner.

In the related art, a multicast technology is applied more and more on the Internet, such as multi-party conference, remote education, telemedicine, and network live streaming, etc. With the deployment of IPv6, it becomes necessary for these multicast data messages to traverse an IPv6 network. For some nodes that cannot directly support BIER Ethernet encapsulation message processing, encapsulating the BIER in an IPv6 header has become a necessary function.

Hereinafter, embodiments of the present disclosure propose a novel message encapsulation manner, in which BIER encapsulation is combined with IPv6 encapsulation, and optimization is performed. In combination with capability advertisement of a control plane, message encapsulation and processing flow is optimized without affecting functions at all, and the forwarding efficiency is increased.

This embodiment provides a method for processing a message header running on the computer terminal. FIG. 2 is a flowchart of a method for processing a message header according to embodiments of the present disclosure. As shown in FIG. 2, the flow includes the following step:

step S202: fields in an IPv6 message header are processed according to fields in a BIER message header by using at least one of the following manners:

the BIER message header is taken as the type of a Routing extension header of the IPv6 message header, and a Segments Left field in the IPv6 message header is processed according to a predefined manner;

the BIER message header is taken as the types of other extension headers of the IPv6 message header, wherein the types of the other extension headers include an option as a Hop-by-Hop extension header;

a BFR-Prefix of the BIER message header is filled in a SA field of the IPv6 message header; and a BIFT-ID field in the BIER message header is embedded into a target field of the IPv6 message header.

By means of the present disclosure, a BIER message and an IPv6 message can be processed as follows: fields in an IPv6 message header are processed according to fields in a BIER message header by using at least one of the following manners: the BIER message header is taken as the type of a Routing extension header of the IPv6 message header, and a Segments Left field in the IPv6 message header is processed according to a predefined manner; the BIER message header is taken as the types of other extension headers of the IPv6 message header, wherein the types of the other extension headers include a new option as a Hop-by-Hop extension header; a BFR-Prefix of the BIER message header is filled in a SA field of the IPv6 message header; and a BIFT-ID field in the BIER message header is embedded into a target field of the IPv6 message header, thereby combining BIER message encapsulation with IPv6 message encapsulation, optimizing message encapsulation and processing flow without affecting functions at all, and increasing the forwarding efficiency; and by means of the technical solutions, the problems in the related art such as optimization cannot be effectively achieved in a process of combined encapsulation of a BIER message and an IPv6 message are solved.

An execution subject of the described step may be a base station, a terminal, etc., but is not limited thereto.

By applying the technical solutions in step S202, as shown in FIG. 3, in this case, Routing Type can be directly set as BIER.

In some exemplary embodiments, the step that a Segments Left field in the IPv6 message header is processed according to a predefined manner, at least includes one of: the Segments Left field is set as a target value, so that all nodes ignore processing on the Segments Left field; a Segments Left field value of a BFIR is set as 255, when an intermediate node forwards a message hop by hop, a process of subtracting 1 is performed on the field value, and when the field value is 0, it indicates that a loop occurs in the message forwarding process; the BFIR sets a Segments Left field value of an ingress node as a maximum hop count reaching an edge device, when an intermediate node forwards a message hop by hop, a process of subtracting 1 is performed on the field value, and when the field value is 0, it indicates that a loop occurs in the message forwarding process; the Segments Left field value of the BFIR is set as 255, when the intermediate node forwards a message hop by hop, a process of subtracting 1 is performed on the field value, and when an IPv6 message of which the Segments Left field value is 255 reaches a BFER, the number of hops that the IPv6 message passes through is calculated according to the current Segments Left field value; and the Segments Left field is set as a maximum border value of a border to be passed through by the IPv6 message, and when passing through the border, a process of subtracting 1 is performed on the field value, and when the field value is 0, it indicates that the message reaches the maximum border and cannot continue to be forwarded to a next area any more.

It can be understood that when the BIER message header is taken as the new type of the Routing extension header of the IPv6 message header, regarding the Segments Left field in the IPv6 message header, it is necessary to select different predefined manners according to functional requirements, to process the Segments Left field.

Optionally, the set target value of the Segments Left field may be 0 or 255 or any other value, so that all the nodes ignore processing on the field, and since this manner is the simplest, it may also be taken as a default support manner of all the nodes.

Optionally, the ingress node BFIR sets the Segments Left field value as 255, or sets the Segments Left field value as the maximum hop count reaching the edge device which can be estimated, and then when the intermediate node forwards a message hop by hop, a process of subtracting 1 is performed on the field value, and when the field value is reduced to 0, it indicates that a loop may occur in the forwarding process of the message, an alarm prompt or an anomalous log record needs to be performed, and the message is no longer forwarded, thereby preventing the message from being forwarded to a domain range to which the message should not be forwarded.

Optionally, the ingress node BFIR sets the Segments Left field value as 255, the intermediate node performs a process of subtracting 1 when performing forwarding hop by hop, and when the message reaches an egress node BFER, the number of hops that the message passes through can be calculated according to the current Segments Left value, and the hop number can be recorded and reported to a controller or other modules, for statistical purposes.

Optionally, the message may pass through multiple IGP domains or some BIER interior boundaries, and thus the number of such boundaries probably passing through may be estimated, and a border value is filled in the Segments Left field value; at this time, when the Segments Left field value is forwarded to other IGP domains or other BIER interior boundaries only on the BFER, a process of subtracting 1 is performed on the field value; if single-domain forwarding occurs, the field value is not processed, and when the field value is 0, it indicates that the message reaches the maximum border and cannot continue to be forwarded to a next area any more.

In some exemplary embodiments, the BIER message header is taken as the types of other extension headers of the IPv6 message header, wherein a type of the other extension headers include an option as a Hop-by-Hop extension header.

In short, in order to improve the application effect of the BIER message header in the IPv6 message header, options about a BIER type may also be added to other extension headers of the IPv6 message header.

In some exemplary embodiments, after the BIER message header is taken as the type of a Routing extension header of the IPv6 message header, and a Segments Left field in the IPv6 message header is processed according to a predefined manner, the method further includes: a control plane advertises support of each node itself for taking the BIER message header as the type of a Routing extension header of the IPv6 message header; that is, in the embodiments of the present disclosure, after the BIER message header is taken as the new type of the Routing extension header of the IPv6, the control plane advertises support of each node itself for newly adding a BIER type to the Routing extension header.

In some exemplary embodiments, the method further includes: support of each node itself for taking the BIER message header as the type of a Routing extension header of the IPv6 message header is advertised by using one of the following manners: advertisement is performed in a TLV manner, the support is carried in BIER information in an IGP for advertisement, and the support is carried in BIER information in a BGP for advertisement.

In some exemplary embodiments, the method further includes: when the support of each node itself for taking the BIER message header as the type of a Routing extension header of the IPv6 message header is set under notification of a BFR-Prefix or a BFR-ID, advertisement is performed in a sub-TLV or sub-sub-TLV manner.

For example, the advertisement manner of the control plane includes: each node advertises support thereof for newly adding a BIER type to the Routing extension header, and advertisement can be performed by a TLV manner by carrying the support information in BIER information in an IGP or BGP; that is, the support is placed under the notification of a BFR-Prefix or a BFR-ID, and advertisement is performed in a sub-TLV manner or a sub-sub-TLV manner. When support situation of the Segments Left processing manner is advertised, if all the nodes only support a certain Segments Left field processing manner in a unified manner, no further advertisement is required; however, if there are nodes supporting different Segments Left field processing manners, the advertisement needs to be distinguished, and the advertisement manner may also be a TLV form.

In cases where all nodes support BIER, Link-Local addresses may also be filled in SA and DA fields of the IPv6 message header, or when some nodes that do not support BIER are passed through, an IPv6 tunnel will be introduced, so that nodes that do not support BIER processing do not need to see a BIER message and process sane, and in this case, operations on the SA and DA of an outer-layer IPv6 header may cause loss of the original SA and DA information. In this way, BFR-Prefix information of the BFIR will be lost. Therefore, in order to ensure that the information is not lost, some specific means need to be used for guarantee, and the guarantee manners include:

In some exemplary embodiments, before a BFR-Prefix of the BIER message header is filled in a SA field of the IPv6 message header, the method further includes: in cases where a node incapable of guaranteeing the transfer capability of the SA field in the IPv6 message header exists in all the nodes, the control plane advertises and collects information of the transfer capability of the SA fields in the IPv6 message headers of all the nodes.

In some exemplary embodiments, after a BFR-Prefix of the BIER message header is filled in a SA field of the IPv6 message header, the method further includes: when it is confirmed that the guarantee capability of the SA field in the IPv6 message header is not supported, N bits of other unused fields in the IPv6 message header are set to 1, in order to indicate that the SA of the IPv6 message header needs to be subjected to guarantee processing, where the value of N is not less than 1.

For example, not all the nodes in a domain can support the guarantee capability of the SA field in the IPv6 message header, and at this time, other unused fields, such as Traffic Class field, in the IPv6 header, or reserved fields in the BIER header, etc., can be used; by setting a certain one bit or several bits in these fields as 1, it is indicated that the SA field of the IPv6 message header needs to be subjected to guarantee processing.

In some exemplary embodiments, before a BIFT-ID field in the BIER message header is embedded into a target field of the IPv6 message header, the method further includes: an address in the IPv6 message is modified, in order to set a routable prefix of the IPv6 message in first target number of bits in the IPv6 message.

It should be noted that the routable prefix of the IPv6 message is set in the first target number of bits in the IPv6 message, wherein the target number of bits may be 64 bits and may also be 96 bits, which is not limited in the present disclosure.

Optionally, the IPv6 address may be divided into two parts, i.e. prefix+BIFT-ID, and a reachable prefix within the domain is placed in first 96 bits, that is, when used for message encapsulation, an IPv6 routable prefix is placed in positions of first 96 bits, and in this way, a situation in which the longest prefix is up to 96 bits can be supported; and the remaining 32 bits are specially used to store BIFT-ID values. Definitely, first 108 bits may also be used to store the reachable prefix, and last 20 bits may be used to store BIFT-ID values, and in this way, a longest prefix up to 108 bits can be supported.

Optionally, according to a format LOC:FUNCT:ARG defined in draft-ietf-spring-srv6-network-programming, the IPv6 address is divided into three parts: in addition to LOC representing the prefix, a new FUNCT is then defined as a BIER function, and a BIFT-ID is filled in the position of the ARG. The method is applicable to a situation where the BFR-Prefix length of a node is short, for example, the LOC part is 64 bits, the FUNC is 32 bits, and the ARG is 32 bits.

In some exemplary embodiments, after an address in the IPv6 message is modified, the method further includes: the BIFT-ID field is embedded into a DA in the IPv6 message; or the BIFT-ID field is embedded into the SA in the IPv6 message; or the BIFT-ID is filled in a Flow Label field of the IPv6 message header, and the DA and the SA in the IPv6 message are not modified, that is, the BIFT-ID is filled in the Flow Label field of the IPv6 header, and the SA and DA are not modified. This method is applicable to a scenario in which a BFR-Prefix must be represented by an address of 128 bits.

That is to say, the IPv6 address is divided into two parts, i.e. prefix+BIFT-ID, and when the BIFT-ID field is embedded into the DA in the IPv6 message, an IPv6 routable prefix of a next hop is filled into first 96 bits of the DA, and a BIFT-ID of the next hop is filled into last 32 bits of the DA; and when the BIFT-ID field is embedded into the SA of the IPv6 message, an IPv6 reachable route prefix of a next hop is normally filled into the DA, a prefix of the first 96 bits of the SA is not modified, and only the last 32 bits thereof are modified into a BIFT-ID of the next hop.

In addition, according to a format LOC:FUNCT:ARG defined in draft-ietf-spring-srv6-network-programming, the IPv6 address is divided into three parts: in addition to LOC representing the prefix, a new FUNCT is then defined as a BIER function, and a BIFT-ID is filled in the position of the ARG. When the BIFT-ID field is embedded into the DA in the IPv6 message, a BFR-Prefix of a next hop is filled into the LOC part of the DA, the FUNC is defined as a new function value representing the BIER, and a BIFT-ID of the next hop is filled into the ARG; when the BIFT-ID field is embedded into the SA of the IPv6 message, an IPv6 reachable route prefix BFR-Prefix of a next hop is normally filled into the DA part, and the LOC part of the SA remains unchanged; if the FUNCT part does not represent the function of the BIER, then the FUNCT part is modified to a function value representing the BIER, and a BIFT-ID of the next hop is filled into the ARG part of the SA.

It should be noted that when optimized use of BIFT-ID is performed, in cases where all nodes support unified BFIT-ID optimization means, the control plane does not require special extension. However, if not all the nodes support this function, in order to avoid error processing, a capability advertisement process also needs to be introduced, and a new Type can still be defined by means of the TLV manner as shown in FIG. 4; and the new Type is carried when information such as a BFR-Prefix following BIER is advertised, that is, these information is carried when advertisement through an IGP or BGP is performed. In this way, the nodes can know each other how other nodes support the function. For example, a new type of sub-TLV or sub-sub-TLV is defined to represent BIFT-ID optimization, and different Types of lower-level sub-sub-TLV or sub-sub-TLV represent different BIFT-ID optimization manners for advertisement; both of them perform advertisement at the same time to indicate support for BIFT-ID optimization, and to specifically indicate the support manner; or only a new type of sub-TLV or sub-sub-TLV is defined to represent BIFT-ID optimization, and the carried Value directly uses 1/2/3 to represent different specific BIFT-ID optimization manners.

In some exemplary embodiments, the method further includes: a forwarding table entry positioning operation of the BIFT-ID in the BIER message header is moved forward and is performed in the IPv6 message.

In some exemplary embodiments, the method further includes: a FUNCTION field of BIER table entry lookup is represented by a specific bit in the IPv6 message address.

In order to better understand the processing flow of a message header, hereinafter, the technical solutions will be described in combination with optional embodiments, but the optional embodiments are not intended to limit the technical solutions of the embodiments of the present disclosure.

Since there are multiple optimization manners for combined encapsulation of a BIER message and an IPv6 message, optionally, when the BIER message header is taken as a new type of the Routing extension header of the IPv6, the following four optional embodiments, i.e. Optional Embodiment I to Optional Embodiment IV, are included:

As shown in FIG. 3, a BIER message is taken as a new type of a Routing extension header of an IPv6; the specific definitions are as shown in the figure; the Routing extension header defines a new type value, e.g. 5, which represents a BIER type; and the BIER message header is filled in "type-specific data" of the Routing extension header. There may be multiple situations for setting of the "Segments Left" field in the Routing extension header, and for details, reference can be made to the illustration in the following optional embodiments.

With regard to the following optional embodiments, in order to facilitate understanding, control plane extension needs to be uniformly defined, which is specifically as follows:

Control plane advertisement flow: all nodes participating in BIER forwarding need to extend a control plane and perform advertisement; and if all nodes in the domain support BIER forwarding, then all the nodes will participate in the control plane advertisement flow:

1. each node advertises support thereof for newly adding a BIER type to the Routing extension header, and advertisement can be performed by a TLV manner by carrying the support information in BIER information in an IGP or BGP; that is, the support is placed under the notification of a BFR-Prefix or a BFR-ID, and advertisement is performed in a sub-TLV manner or a sub-sub-TLV manner. As shown in FIG. 4, a type 20 or other numerical values are used to represent support for Routing extension header encapsulation BIER type.
2. When support situation of the Segments Left processing manner is advertised, if all the nodes only support a certain Segments Left field processing manner in a unified manner, no further advertisement is required; however, if there are nodes supporting different Segments Left field processing manners, the advertisement needs to be distinguished. There may be two specific advertisement manners: one advertisement manner is to perform advertisement by generating advertisement TLV in which secondary TLV follows a BIER new Routing extension header type, the format may be similar to that shown in FIG. 3, and different processing manners of the Segments Left are represented by Type 1/2/3/4, etc.; and another advertisement manner is to encapsulate BIER type sub-TLV or sub-sub-TLV by directly using the Routing extension header, and a Value thereof is 1/2/3/4, etc., to represent support for different processing manners on the Segments Left.

When the BIER message header is taken as a new type of the Routing extension header of the IPv6, Optional Embodiment I (i.e. processing manner I regarding Segments Left): The set Segments Left field is 0 or 255 or any other value, and all nodes ignore processing on this field. This manner is the simplest, and thus can also be taken as a default support manner of all the nodes.

As shown in FIG. 3, after the control plane performs the described method, a data plane encapsulation and forwarding flow is as follows:

after a BFIR receives a multicast message and normally encapsulates a BIER message header according to a BFER requiring to be received, when an external IPv6 header is encapsulated, the following encapsulation principle is followed:

step 1101, a Routing extension header representing a BIER type is generated, and a Routing Type field in the Routing extension header is set to a value representing the BIER type, such as 5. The Segments Left field is set to 0, or other values such as 255.

Step 1102, a Next Header of the Routing extension header is set to value 59 (representing subsequent No Next Header), or a corresponding value is looked up according to a Proto in the BIER message header for setting, for example, if a Proto value in the BIER message header is 4, it indicates that a payload thereof is an IPv4 message, and a Next Header value of the Routing extension header is also set to 4 (representing IPv4); and if the Proto value in the BIER message header is 6, it represents that a subsequent message is an IPv6 message, and the Next Header value of the Routing extension header is set to 41 (representing an IPv6 message).

When receiving the message, a BFR processes same and finds that the message carries a Routing extension header, further parses the Routing extension header, and finds that the type therein is a type representing BIER, and then performs processing according to the following flow:

Step 1201, a normal processing flow is performed on the BIER message in the Routing extension header, and a local BIER routing table is looked up according to a Bit String in the BIER message header and is forwarded; although the Segments Left value is 0 or another value, ignore processing is performed on the value.

When the current node is a branch node and there are a plurality of next hops, a plurality of BIER messages are generated by means of replication and are encapsulated in a BIER type extension header of IPv6 Routing, and the encapsulation manner is similar to BFIR processing.

Definitely, the BFIR itself may also be a branch node, and may also encapsulate multiple messages according to the branch for sending.

When receiving the message, a BFER processes same and finds that the message carries a Routing extension header, further parses the Routing extension header, and finds that the type thereof is a BIER type, and performs processing according to the following flow:

step 1301, a normal processing flow is performed on the BIER message in the Routing extension header, and when it is found that a local node is an egress node, the whole outer-layer IPv6 encapsulation is removed, and after the message includes a Routing extension header containing a BIER type, the message is then forwarded to a receiver.

Further, if it is found that the present node is a transit node, that is, both a receiver and a next-hop device need to forward the message, then the message continues to be forwarded to a next-hop node according to the flow of the BFR.

When the BIER message header is taken as a new type of the Routing extension header of the IPv6, Optional Embodiment II (i.e. processing manner II regarding Segments Left): the ingress node BFIR sets the Segments Left field value as 255, or sets the Segments Left field value as the maximum hop count reaching the edge device which can be estimated; and then when the intermediate node forwards a message hop by hop, a process of subtracting 1 is performed on the field value, and when the field value is reduced to 0, it indicates that a loop may occur in the forwarding process of the message, an alarm prompt or an anomalous log record needs to be performed, and the message is no longer forwarded, thereby preventing the message from being forwarded to a domain range to which the message should not be forwarded.

As shown in FIG. 3, after the control plane performs the described method, a data plane encapsulation and forwarding flow is as follows:

after a BFIR receives a multicast message and normally encapsulates a BIER message header according to a BFER requiring to be received, when an external IPv6 header is encapsulated, the following encapsulation principle is followed:

step 2101, a Routing extension header representing a BIER type is generated, and a Routing Type field in the Routing extension header is set to a value representing the BIER type, such as 5. The Segments Left field is set to 255 or the estimated maximum hop count to be passed through, for example, it is expected that 10 hops are required to reach the farthest receiver, and the value may also be set to 10.

Step 2102, the set contents are the same as those of step 1102 in Optional Embodiment I.

When receiving the message, a BFR processes same and finds that the message carries a Routing extension header, further parses the Routing extension header, and finds that the type therein is a type representing BIER, and then performs processing according to the following flow:

step 2201, a normal processing flow is performed on the BIER message in the Routing extension header, and a process of subtracting 1 is performed on the Segments Left; when it is found that the Segments Left is 0, it indicates that the maximum hop count has been reached; if a local BIER routing table is looked up according to a Bit String in the BIER message header and it is found that there is still a next hop requiring forwarding of the message, then forwarding cannot be performed, and alarm processing needs to be performed, or the situation is sent up to a controller for reporting same; and if the Segments Left is not 0, forwarding processing is continued according to step 1201 in Optional Embodiment I.

When receiving the message, a BFER processes same and finds that the message carries a Routing extension header, further parses the Routing extension header, and finds that the type thereof is a BIER type, and performs processing according to the following flow:

step 2301, a normal processing flow is performed on the BIER message in the Routing extension header, and when it is found that a local node is an egress node, the whole outer-layer IPv6 encapsulation is removed, and after the message includes a Routing extension header containing a BIER type, the message is then forwarded to a receiver.

Step 2302, if it is found that the present node is a transit node, that is, both a receiver and a next-hop device need to forward the message, then according to the principle in step 2201, when the Segments Left value is 0, the message cannot be forwarded to a next-hop node, and an alarm needs to be performed or this situation is reported to a controller for processing. When the Segments Left value is not 0, a process of subtracting 1 is performed on the Segments Left, and the message continues to be forwarded to a next-hop node according to a BFR flow.

When the BIER message header is taken as a new type of the Routing extension header of the IPv6, Optional Embodiment III (i.e. processing manner III regarding Segments Left):

the ingress node BFIR sets the Segments Left field value as 255, the intermediate node performs a process of subtracting 1 when performing forwarding hop by hop, and when the message reaches an egress node BFER, the number of hops that the message passes through can be calculated according to the current Segments Left value, and the hop number can be recorded and reported to a controller or other modules, for statistical purposes.

As shown in FIG. 3, after the control plane performs the described method, a data plane encapsulation and forwarding flow is as follows:

after a BFIR receives a multicast message and normally encapsulates a BIER message header according to a BFER requiring to be received, when an external IPv6 header is encapsulated, the following encapsulation principle is followed:

step 3101, same as step 2101 of Optional Embodiment II, in which the Segments Left field is set to 255.

Step 2102, the set contents are the same as those of step 1102 in Optional Embodiment I.

When receiving the message, a BFR processes same and finds that the message carries a Routing extension header, further parses the Routing extension header, and finds that the type therein is a type representing BIER, and then performs processing according to the following flow:

step 3201, same as the processing in step 2201 in Optional Embodiment II.

When receiving the message, a BFER processes same and finds that the message carries a Routing extension header, further parses the Routing extension header, and finds that the type thereof is a BIER type, and performs processing according to the following flow:

step 3301, same as the processing in step 2301 in Optional Embodiment II. However, at the same time, the current Segments Left value is reported to a controller or other management modules, so that the controller can acquire the number of hops which the message passes through. This facilitates subsequent hop count setting.

When the BIER message header is taken as a new type of the Routing extension header of the IPv6, Optional Embodiment IV (i.e. processing manner IV regarding Segments Left):

the message may pass through multiple IGP domains or some BIER interior boundaries, and thus the number of such boundaries probably passing through may be estimated, and a border value is filled in the Segments Left field value; at this time, when the Segments Left field value is forwarded to other IGP domains or other BIER interior boundaries only on the BFER, a process of subtracting 1 is performed on the field value; if single-domain forwarding occurs, the field value is not processed, and when the field value is 0, it indicates that the message reaches the maximum border and cannot continue to be forwarded to a next area any more.

As shown in FIG. 3, after the control plane performs the described method, a data plane encapsulation and forwarding flow is as follows:

after a BFIR receives a multicast message and normally encapsulates a BIER message header according to a BFER requiring to be received, when an external IPv6 header is encapsulated, the following encapsulation principle is followed:

step 4101, same as step 2101 in Optional Embodiment II, in which the Segments Left field is set as the estimated maximum border value. As shown in FIG. 5, assuming that the BIER domain spans 3 IGP Areas to the longest, the Segments Left field can be set as 3.

Step 4102, the set contents are the same as those of step 1102 in Optional Embodiment I.

When receiving the message, a BFR processes same and finds that the message carries a Routing extension header, further parses the Routing extension header, and finds that the type therein is a type representing BIER, and then performs processing according to the following flow:

step 4201, when a BFR performs BIER message processing and forwarding, if it is found that the Segments Left value is 0, it indicates that the message has reached the maximum border, and when looking up a next hop, if a next hop is still in the same Area, for example, a next hop forwarded by BFR2 in FIG. 5 still belongs to Area3, then normal forwarding is performed, and no operation is performed on the Segments Left. However, if the BFR2 finds that a next hop is at another Area4, the BFR2 cannot forward the message to a next hop belonging to the Area4, and an alarm needs to be performed or an anomalous situation needs to be reported to a controller.

Therefore, if the message is forwarded to other nodes in the same IGP Area, no operation is performed on the Segments Left, and only when the message is forwarded to a next hop of another IGP Area, a 1-subtracting operation needs to be performed on the Segments Left. As shown in FIG. 5, only regarding BFR nodes, such as BFR1 and BFR2, which span IGP Areas, and when the next hop of forwarding is another Area, for example, when BFR1 performs forwarding from Area1 to a next hop in Area2 or BFR2 performs forwarding from Area3 to a next hop in Area4, a 1-subtracting operation is performed on the Segments Left; and if a next hop to which BFR1 forwards the message still belongs to Area1, 1-subtracting operation is not performed on the Segments Left.

When receiving the message, a BFER processes same and finds that the message carries a Routing extension header, further parses the Routing extension header, and finds that the type thereof is a BIER type, and performs processing according to the following flow:

step 4301, same as the processing in step 2301 in Optional Embodiment II.

Step 4302, when a present BFER is a transit node at the same time, operation and judgment on the Segments Left are performed according to step 4201.

By using the optimization means regarding the Segments Left field in the IPv6 message header, BIER can be deeply combined with IPv6, the IPv6 Routing extension header is used to carry BIER message header information for multicast routing; and in combination with the processing manner of the Segments Left field, the transfer range of a BIER message in an IPv6 network can be effectively controlled, and in combination with means such as reporting to a controller, the forwarding of the BIER message in the IPv6 network is more controllable.

There are multiple optimization manners for combined encapsulation of a BIER message and an IPv6 message, and optionally, a SA field of the IPv6 can be filled into a BFR-Prefix of a BFIR, and the specific steps are as shown in the following Optional Embodiment V:

when a BIER message header is used in combination with an IPv6 header, a BFR-Prefix of a BFIR, i.e. an advertisement prefix address for a BIER path, is encapsulated into a SA field of the IPv6 header, so that the message can carry information of an ingress node BFIR, in order to facilitate fault detection and performance detection, and the ingress node can be found when performing repeated traffic judgment.

When BIER forwarding is established and the forwarding itself is established according to an IPv6 plane, a BFR-Prefix itself of a BFIR is an IPv6 address of a BFIR node, and at this time, the value can be directly filled into a SA field of the IPv6.

In cases where all nodes support BIER, SA and DA fields filled in the IPv6 header may also be Link-Local addresses, or when some nodes that do not support BIER are passed through, an IPv6 tunnel will be introduced, so that nodes that do not support BIER processing do not need to see a BIER message and process sane, and in this case, operations on the SA and DA of an outer-layer IPv6 header may cause loss of the original SA and DA information. In this way, the BFR-Prefix information of the BFIR is lost. Therefore, in order to ensure that the information is not lost, some specific means need to be adopted for guaranteeing, and for details, reference can be made to the following steps:

step I: control plane extension: if all the nodes can guarantee transfer of the SA field of the IPv6 message header (i.e. IPv6 SA) in a unified manner, no special control plane extension is required. If a node incapable of guaranteeing IPv6 SA transfer exists, before a data plane operates, the control plane needs to advertise and collect the capability. The advertisement manner may still be performed by using the TLV manner as shown in FIG. 4, and a new extension type manner indicates that IPv6 SA guarantee is supported.

When supporting this function, the BFIR, the BFER and all BFRs all carry the IPv6 SA guarantee capability in the advertisement. No advertisement is performed on routers that do not support this capability. The specific advertisement may be performed through IGP and BGP protocol extensions.

Step II: data plane processing: after a BFIR receives a multicast message and normally encapsulates a BIER message header according to a BFER requiring to be received, when an external IPv6 header is encapsulated, the following encapsulation principle is followed:

step 5101, the SA of the IPv6 header is encapsulated as a BFR-Prefix of the BFIR, or any other IPv6 address that may be used to uniquely identify the BFIR.

Step S102, not all the nodes in a domain can support the IPv6 SA guarantee capability, and other unused fields, such as Traffic Class field, in the IPv6 header, or reserved fields in the BIER header, etc., can be used; by setting a certain one bit or several bits in these fields as 1, it is indicated that the SA of the IPv6 needs to be subjected to guarantee processing.

When receiving the message, a BFR performs processing according to the following flow:

step 5201, if it is found that IPv6 SA guarantee processing is not required according to the BIER message header, forwarding is performed according to a normal flow; and if it is found that IPv6 SA guarantee processing needs to be performed, when a next hop is found and the next hop performs forwarding processing, the SA in the current IPv6 header remains unchanged, and the DA may be set as a global routable IPv6 address of the next hop; and there may be multiple situations in forwarding, the next hop is in direct connection or the next hop is in non-direct connection.

When the next hop is in direct connection, if the next hop supports IPv6 encapsulation, while the SA remains unchanged, the DA is set as a next-hop global routable IPv6 address and then can be directly sent; and if the next hop supports Ethernet encapsulation or MPLS encapsulation, the current IPv6 header cannot be directly replaced, and instead, an outer layer of the IPv6 header is re-encapsulated with Ethernet or MPLS, and while the SA in the IPv6 header remains unchanged, the DA in the IPv6 header is set as a global routable IPv6 address of the next hop.

When the next hop is in non-direct connection, encapsulation needs to be performed by using a tunnelling technique, and while the SA in the IPv6 header remains unchanged, the DA is set as a global routable IPv6 address of the next hop. If a tunnel used is still an IPv6 tunnel, then the SA does not need to be modified, and the message can be directly sent. If the tunnel used is a Generic Routing Encapsulation (GRE) tunnel or the like, the SA needs to be modified as a start point of the tunnel, and then tunnel encapsulation needs to be performed outside the current IPv6 header, in order to ensure that the SA is not modified.

Definitely, the BFIR may also encounter a situation that a next hop requires tunnel encapsulation, and will perform processing in the same manner as the BFR.

When a BFER receives the message, if it is found that the message is not subjected to SA guarantee, then no special processing is required. If it is found that the message is subjected to SA guarantee, then processing is performed according to the following flow:

step 5301, if there is an outer-layer tunnel, the outer-layer tunnel is stripped, and the SA in the IPv6 header is removed and taken as a BFR-Prefix of a BFIR for processing. It can be used for fault or path detection, or used for repeated message judgment and discarding.

It should be noted that when any one hop finds that reporting to the BFIR is necessary due to fault, detection or other reasons, the message is sent by taking the guaranteed SA as a DA.

The BIER message header has a BFIR-ID, and this value represents a BFR-ID value of the ingress node BFIR, and is usually used for performance measurement, or used during fault detection. In a network, when multiple BFIRs repeatedly forward the same traffic, for example, in a BFIR protection scenario, an egress node BFER may also perform judgment according to BFIR-ID values, choose to receive traffic of a certain BFIR-ID, and discard traffic sent from other BFIRs.

However, in practical applications of BIER, there may be a situation in which the ingress node BFIR is not allocated with a BFR-ID, that is to say, all egress nodes BFERs must be allocated with BFR-IDs. However, the situation may not be necessarily the same for the ingress node BFIR, and therefore there may be a situation in which the BFIR is not allocated with a BFR-ID. In this way, the situation that the BFIR-ID value in the BIER message header cannot be filled may occur. In this case, the egress node BFER cannot perform repeated traffic judgment according to the value, and if repeated traffic exists, forwarding of the repeated traffic may occur.

Thus, when a BIER message header is used in combination with an IPv6 header, a BFR-Prefix of a BFIR, i.e. an advertisement prefix address for a BIER path, is encapsulated into a SA field of the IPv6 header, so that the message can carry information of an ingress node BFIR, in order to facilitate fault detection and performance detection, and the ingress node can be found when repeated traffic judgment is performed.

By using the optimization means of filling the BFR-Prefix of the BIER message header in the SA field of the IPv6 message header, repeated traffic judgment of the BIER can be moved forward and performed in the IPv6 message, and the ingress device BFIR can achieve BIER repeated traffic judgment without being allocated with a BFR-ID, which can reduce the allocation number of BFR-IDs and achieve more accurate repeated traffic judgment.

Since there are multiple optimization manners for combined encapsulation of a BIER message and an IPv6 message, optionally, BIFT-ID optimization can also be performed, including the following three embodiments of Optional Embodiment VI to Optional Embodiment VIII:

it should be noted that before the data plane flow of the following optional embodiments is performed, if all nodes can use a unified BIFT-ID optimization manner, then no special control plane extension is required. If there are different processing manners or some nodes cannot support BIFT-ID optimization, then before a data plane performs an operation, the control plane needs to advertise and collect the capability. The advertisement manner may still be performed by using the TLV manner as shown in FIG. 4, and a new extension type manner indicates that BIFT-ID optimization is supported; when supporting this function, the BFIR, the BFER and all BFRs all carry the BIFT-ID optimization capability in the advertisement, and no advertisement is performed on routers that do not support this capability, and the specific advertisement may be performed through IGP and BGP protocol extensions.

Optional Embodiment VI a BIFT-ID carrying manner is optimized, and when the length of a BFR-Prefix of a node in a network is less than or equal to 96 bits, information of the BIFT-ID is filled in a DA of an IPv6. That is, the last 32 bits of the DA in the IPv6 message are used to store BIFT-ID values, and the first bits are used to store a normal IPv6 reachable route prefix, BFR-Prefix. At this time, the processing steps are as follows: data plane processing:

after a BFIR receives a multicast message and normally encapsulates a BIER message header according to a BFER requiring to be received, when an external IPv6 header is encapsulated, the following encapsulation principle is followed:

step 6101, the first 96 bits of the DA of the IPv6 header are encapsulated as a BFR-Prefix of a next hop, and a BIFT-ID advertised by the next hop is filled into low 32 bits of the DA.

When receiving the message, a BFR performs processing according to the following flow:

step 6201, when performing regular local prefix judgment according to the received message, the first 96 bits of the IPv6 DA are taken to perform look up and judgment, and when it is found that the prefix is a local prefix, the last 32 bits of the DA are subjected to a BIER table entry positioning operation, and then table lookup is performed according to the BIER message header.

Step 6202, when preparing to replicate the message to a next hop, if the next hop supports a BIFT-ID optimization method, the IPv6 message is encapsulated according to an optimization manner of the next hop, for example, when the next hop also supports that the first 96 bits of the DA are encapsulated as a BFR-Prefix, and last 32 bits are encapsulated as a BIFT-ID, according to this rule, the BFR-Prefix and the BIFT-ID of the next hop are encapsulated.

If some next hops support another BIFT-ID optimization manner, for example, these next hops support that the first 64 bits are encapsulated as a BFR-Prefix, the middle 32 bits are encapsulated as a function representing BIER, and the last 32 bits are encapsulated as a BIFT-ID, then according to this rule, the BFR-Prefix and the BIFT-ID of the next hops are encapsulated.

If some next hops do not support the BIFT-ID optimization manner, BIFT-ID optimization processing is not performed on the content of the IPv6 header.

When receiving the message, a BFER performs processing according to the following flow:

step 6301, similar to step 6201, in addition to judging that the prefix is a local prefix, it is further judged that there is a local receiver according to the BIER message header, then the IPv6 header and the BIER message header of the message are stripped off and then sent to the receiver.

Step 6302, if the present BFER node is also a transit node, that is, there is also a next hop that requires continuous sending, then the manner of step 6202 can be adopted.

It should be noted that the encapsulation manner is changed according to different situations of the next hop; this is applicable to all nodes including BFIR, BFRs and transit BFERs, rather than merely BFR nodes.

Optional Embodiment VII a BIFT-ID carrying manner is optimized, and when the length of a BFR-Prefix of a node in a network is less than or equal to 96 bits, information of the BIFT-ID is filled in an SA of an IPv6. That is, the last 32 bits of the SA in the IPv6 message are used to store BIFT-ID values, and the first bits are used to store a normal IPv6 reachable route prefix, BFR-Prefix. At this time, the processing steps are as follows:

data plane processing:

after a BFIR receives a multicast message and normally encapsulates a BIER message header according to a BFER requiring to be received, when an external IPv6 header is encapsulated, the following encapsulation principle is followed:

step 7101, the first 96 bits of the SA of the IPv6 header are encapsulated as a current BFR-Prefix, and a BIFT-ID advertised by the next hop is filled into low 32 bits of the SA.

When receiving the message, a BFR performs processing according to the following flow:

step 7201, when performing regular local prefix judgment according to the received message, processing is performed according to a normal DA lookup flow, and when it is found that the prefix is a local prefix, the last 32 bits of the SA are subjected to a BIER table entry positioning operation, and then table lookup is performed according to the BIER message header.

Step 7202, when preparing to replicate a message to a next hop, if the next hop supports a BIFT-ID optimization method, an IPv6 message is encapsulated according to an optimization manner of the next hop, for example, when the next hop also supports that the first 96 bits of SA are encapsulated as a BFR-Prefix, and last 32 bits are encapsulated as a BIFT-ID, and according to this rule, the BIFT-ID of the next hop is encapsulated into low 32 bits of the SA.

If some next hops support another BIFT-ID optimization manner, for example, these next hops support that the first 64 bits are encapsulated as a BFR-Prefix, the middle 32 bits are encapsulated as a function representing BIER, and the last 32 bits are encapsulated as a BIFT-ID, then according to this rule, the BIFT-IDs of the next hops are encapsulated into low 32 bits of the SA.

If some next hops do not support the BIFT-ID optimization manner, BIFT-ID optimization processing is not performed on the content of the IPv6 header.

When receiving the message, a BFER performs processing according to the following flow:

step 7301, similar to step 7201, in addition to judging that the prefix is a local prefix, it is further judged that there is a local receiver according to the BIER message header, then the IPv6 header and the BIER message header of the message are stripped off and then sent to the receiver.

Step 7302, if the present BFER node is also a transit node, that is, there is also a next hop that requires continuous sending, then the manner of step 7202 can be adopted.

It should be noted that the encapsulation manner is changed according to different situations of the next hop; this is applicable to all nodes including BFIR, BFRs and transit BFERs, rather than merely BFR nodes.

Optional Embodiment VIII a BIFT-ID carrying manner is optimized, and the BIFT-ID is filled into a Flow Label field of the IPv6 message. At this time, the processing steps are as follows:

data plane processing:

after a BFIR receives a multicast message and normally encapsulates a BIER message header according to a BFER requiring to be received, when an external IPv6 header is encapsulated, the following encapsulation principle is followed:

step 8101, the SA/DA of the IPv6 header is encapsulated according to a normal processing method, and a Flow Label field is encapsulated into a BIFT-ID of a next hop.

When receiving the message, a BFR performs processing according to the following flow:

step 8201, when performing regular local prefix judgment according to the received message, processing is performed according to a normal DA lookup flow, and when it is found that the prefix is a local prefix, a BIER table entry positioning operation is performed by taking the Flow Label field as the BIFT-ID, and then table lookup is performed according to the BIER message header.

Step 8202, when preparing to replicate the message to a next hop, if the next hop supports a BIFT-ID optimization method, the IPv6 message is encapsulated according to an optimization manner of the next hop, for example, if the next hop also supports encapsulating the BIFT-ID into the Flow Label field, then according to this rule, the BIFT-ID of the next hop is encapsulated into the Flow Label field.

If some next hops support another BIFT-ID optimization manner, for example, these next hops support that the BIFT-ID is embedded into the DA, the first 96 bits are encapsulated as a BFR-Prefix, the middle 32 bits are encapsulated as a function representing BIER, and the last 32 bits are encapsulated as a BIFT-ID, then according to this rule, the BIFT-IDs of the next hops are encapsulated into low 32 bits of the DA.

If some next hops do not support the BIFT-ID optimization manner, BIFT-ID optimization processing is not performed on the content of the IPv6 header.

When receiving the message, a BFER performs processing according to the following flow:

step 8301, similar to step 8201, in addition to judging that the prefix is a local prefix, it is further judged that there is a local receiver according to the BIER message header, then the IPv6 header and the BIER message header of the message are stripped off and then sent to the receiver.

Step 8302, if the present BFER node is also a transit node, that is, there is also a next hop that requires continuous sending, then the manner of step 8202 can be adopted.

It should be noted that the encapsulation manner is changed according to different situations of the next hop; this is applicable to all nodes including BFIR, BFRs and transit BFERs, rather than merely BFR nodes.

By means of optimized use of BIFT-ID, the advantages of combined use of BIER and IPv6 can be further excited, thereby expanding the BIER application scenario, and optimizing the forwarding processing and forwarding efficiency.

In conclusion, by means of the technical solutions, optional embodiments of the present disclosure provide a novel message encapsulation method, in which BIER encapsulation is combined with IPv6 encapsulation, and fields in an outer-layer IPv6 header are used to perform optimization processing on the fields in the BIER message header without affecting the implementation of functions, and the optimization processing includes three large categories: the BIER message header is encapsulated into a new type of a Routing extension header of an IPv6, optimization of a SA field of the IPv6 message header, and optimization of a BIFT-ID; and capability advertisement is introduced for negotiation, thereby achieving the purposes of optimizing message encapsulation and improving processing speed, and broadening BIER use scenarios. In addition, by making full use of a combination of the two, optimization of carrying and encapsulation of data messages can be achieved, and the processing flow is accelerated, which has an excellent role in facilitating the development of a multicast technology.

From the description of the embodiments, a person skilled in the art would have been able to clearly understand that the methods in the embodiments may be implemented by using software and necessary general hardware platforms, and of course may also be implemented using hardware, but in many cases, the former is a better embodiment. On the basis of such understanding, the portion of the technical solution of the present disclosure that contributes in essence or contributes to the related art may be embodied in the form of a software product. The computer software product is stored in a storage medium (such as an ROM/RAM, a magnetic disk and an optical disc), and includes several instructions for enabling a terminal device (which may be a mobile phone, a computer, a server, or a network device, etc.) to perform the methods as described in various embodiments of the present disclosure.

An apparatus for processing a message header is also provided in the present embodiment, wherein the apparatus is configured to implement the embodiments and optional embodiments, and what has been described will not be repeated again. As used below, the term "module" may implement a combination of software and/or hardware of predetermined functions. Although the apparatus described in the following embodiments is preferably implemented in software, implementation in hardware or a combination of software and hardware is also possible and could have been conceived.

Figure 6:
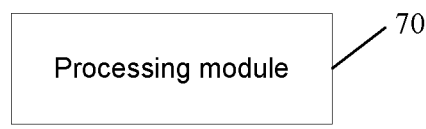
FIG. 6 is a schematic structural diagram of an apparatus for processing a message header according to embodiments of the present disclosure.

FIG. 6 is a structural block diagram of an apparatus for processing a message header according to embodiments of the present disclosure. As shown in FIG. 6, the apparatus includes:

a processing module 70, configured to process fields in an IPv6 message header according to fields in a BIER message header by using at least one of the following manners: the BIER message header is taken as the type of a Routing extension header of the IPv6 message header, and a Segments Left field in the IPv6 message header is processed according to a predefined manner; the BIER message header is taken as the types of other extension headers of the IPv6 message header, wherein the types of the other extension headers include an option as a Hop-by-Hop extension header; a BFR-Prefix of the BIER message header is filled in a SA field of the IPv6 message header; and a BIFT-ID field in the BIER message header is embedded into a target field of the IPv6 message header.

By means of the present disclosure, a BIER message and an IPv6 message can be processed as follows: fields in an IPv6 message header are processed according to fields in a BIER message header by using at least one of the following manners: the BIER message header is taken as the type of a Routing extension header of the IPv6 message header, and a Segments Left field in the IPv6 message header is processed according to a predefined manner; the BIER message header is taken as the types of other extension headers of the IPv6 message header, wherein the types of the other extension headers include a new option as a Hop-by-Hop extension header; a BFR-Prefix of the BIER message header is filled in a SA field of the IPv6 message header; and a BIFT-ID field in the BIER message header is embedded into a target field of the IPv6 message header, thereby combining BIER message encapsulation with IPv6 message encapsulation, optimizing message encapsulation and processing flow without affecting functions at all, and increasing the forwarding efficiency; and by means of the technical solutions, the problems in the related art such as optimization cannot be effectively achieved in a process of combined encapsulation of a BIER message and an IPv6 message are solved.

By applying the technical solutions, as shown in FIG. 3, in this case, Routing Type can be directly set as BIER.

In some exemplary embodiments, the processing module 70 processes a Segments Left field in the IPv6 message header according to a predefined manner, which at least includes one of: the Segments Left field is set as a target value, so that all nodes ignore processing on the Segments Left field; a Segments Left field value of a BFIR is set as 255, when an intermediate node forwards a message hop by hop, a process of subtracting 1 is performed on the field value, and when the field value is 0, it indicates that a loop occurs in the message forwarding process; the BFIR sets a Segments Left field value of an ingress node as a maximum hop count reaching an edge device, when an intermediate node forwards a message hop by hop, a process of subtracting 1 is performed on the field value, and when the field value is 0, it indicates that a loop occurs in the message forwarding process; the Segments Left field value of the BFIR is set as 255, when the intermediate node forwards a message hop by hop, a process of subtracting 1 is performed on the field value, and when an IPv6 message of which the Segments Left field value is 255 reaches a BFER, the number of hops that the IPv6 message passes through is calculated according to the current Segments Left field value; and the Segments Left field is set as a maximum border value of a border to be passed through by the IPv6 message, and when passing through the border, a process of subtracting 1 is performed on the field value, and when the field value is 0, it indicates that the message reaches the maximum border and cannot continue to be forwarded to a next area any more.

It can be understood that when the BIER message header is taken as the new type of the Routing extension header of the IPv6 message header, regarding the Segments Left field in the IPv6 message header, it is necessary to select different predefined manners according to functional requirements, to process the Segments Left field.

Optionally, the set target value of the Segments Left field may be 0 or 255 or any other value, so that all the nodes ignore processing on the field, and since this manner is the simplest, it may also be taken as a default support manner of all the nodes.

Optionally, the ingress node BFIR sets the Segments Left field value as 255, or sets the Segments Left field value as the maximum hop count reaching the edge device which can be estimated, and then when the intermediate node forwards a message hop by hop, a process of subtracting 1 is performed on the field value, and when the field value is reduced to 0, it indicates that a loop may occur in the forwarding process of the message, an alarm prompt or an anomalous log record needs to be performed, and the message is no longer forwarded, thereby preventing the message from being forwarded to a domain range to which the message should not be forwarded.

Optionally, the ingress node BFIR sets the Segments Left field value as 255, the intermediate node performs a process of subtracting 1 when performing forwarding hop by hop, and when the message reaches an egress node BFER, the number of hops that the message passes through can be calculated according to the current Segments Left value, and the hop number can be recorded and reported to a controller or other modules, for statistical purposes.

Optionally, the message may pass through multiple IGP domains or some BIER interior boundaries, and thus the number of such boundaries probably passing through may be estimated, and a border value is filled in the Segments Left field value; at this time, when the Segments Left field value is forwarded to other IGP domains or other BIER interior boundaries only on the BFER, a process of subtracting 1 is performed on the field value; if single-domain forwarding occurs, the field value is not processed, and when the field value is 0, it indicates that the message reaches the maximum border and cannot continue to be forwarded to a next area any more.

In some exemplary embodiments, the processing module is further configured to take the BIER message header as the types of other extension headers of the IPv6 message header, wherein the types of the other extension headers include an option as a Hop-by-Hop extension header.

In short, in order to improve the application effect of the BIER message header in the IPv6 message header, options about a BIER type may also be added to other extension headers of the IPv6 message header.

In some exemplary embodiments, the apparatus further includes: an advertisement module, configured to notify, by a control plane, each node of support thereof for using the BIER message header as the type of the Routing extension header of the IPv6 message header; that is, in the embodiments of the present disclosure, after the BIER message header is taken as the new type of the Routing extension header of the IPv6, the control plane advertises support of each node itself for newly adding a BIER type to the Routing extension header.

In some exemplary embodiments, the advertisement module is further configured to advertise support of each node itself for taking the BIER message header as the type of a Routing extension header of the IPv6 message header by using one of the following manners: advertisement is performed in a TLV manner, the support is carried in BIER information in an IGP for advertisement, and the support is carried in BIER information in a BGP for advertisement.

In some exemplary embodiments, the advertisement module is further configured to perform advertisement in a sub-TLV or sub-sub-TLV manner when the support of each node itself for taking the BIER message header as the type of a Routing extension header of the IPv6 message header is set under notification of a BFR-Prefix or a BFR-ID.

For example, the advertisement manner of the control plane includes: each node advertises support thereof for newly adding a BIER type to the Routing extension header, and advertisement can be performed by a TLV manner by carrying the support information in BIER information in an IGP or BGP; that is, the support is placed under the notification of a BFR-Prefix or a BFR-ID, and advertisement is performed in a sub-TLV manner or a sub-sub-TLV manner. When support situation of the Segments Left processing manner is advertised, if all the nodes only support a certain Segments Left field processing manner in a unified manner, no further advertisement is required; however, if there are nodes supporting different Segments Left field processing manners, the advertisement needs to be distinguished, and the advertisement manner may also be a TLV form.

In cases where all nodes support BIER, Link-Local addresses may also be filled in SA and DA fields of the IPv6 message header, or when some nodes that do not support BIER are passed through, an IPv6 tunnel will be introduced, so that nodes that do not support BIER processing do not need to see a BIER message and process sane, and in this case, operations on the SA and DA of an outer-layer IPv6 header may cause loss of the original SA and DA information. In this way, BFR-Prefix information of the BFIR will be lost. Therefore, in order to ensure that the information is not lost, some specific means need to be used for guarantee, and the guarantee manners include:

In some exemplary embodiments, the apparatus further includes: a guarantee module, configured to advertise and collect, by the control plane, information of the transfer capability of the SA field in the IPv6 message header of all the nodes in cases where a node incapable of guaranteeing the transfer capability of the SA field in the IPv6 message header exists in all the nodes.

In some exemplary embodiments, the apparatus further includes: a determination module, configured to set N bits of other unused fields in the IPv6 message header to 1 when it is confirmed that the guarantee capability of the SA field in the IPv6 message header is not supported, in order to indicate that the SA of the IPv6 message header needs to be subjected to guarantee processing, where the value of N is not less than 1.

For example, not all the nodes in a domain can support the guarantee capability of the SA field in the IPv6 message header, and at this time, other unused fields, such as Traffic Class field, in the IPv6 header, or reserved fields in the BIER header, etc., can be used; by setting a certain one bit or several bits in these fields as 1, it is indicated that the SA field of the IPv6 message header needs to be subjected to guarantee processing.

In some exemplary embodiments, the apparatus further includes: a modification module, configured to modify an address in the IPv6 message, in order to set a routable prefix of the IPv6 message in first target number of bits in the IPv6 message.

It should be noted that the routable prefix of the IPv6 message is set in the first target number of bits in the IPv6 message, wherein the target number of bits may be 64 bits and may also be 96 bits, which is not limited in the present disclosure.

Optionally, the IPv6 address may be divided into two parts, i.e. prefix+BIFT-ID, and a reachable prefix within the domain is placed in first 96 bits, that is, when used for message encapsulation, an IPv6 routable prefix is placed in positions of first 96 bits, and in this way, a situation in which the longest prefix is up to 96 bits can be supported; and the remaining 32 bits are specially used to store BIFT-ID values. Definitely, first 108 bits may also be used to store the reachable prefix, and last 20 bits may be used to store BIFT-ID values, and in this way, a longest prefix up to 108 bits can be supported.

Optionally, according to a format LOC:FUNCT:ARG defined in draft-ietf-spring-srv6-network-programming, the IPv6 address is divided into three parts: in addition to LOC representing the prefix, a new FUNCT is then defined as a BIER function, and a BIFT-ID is filled in the position of the ARG. The method is applicable to a situation where the BFR-Prefix length of a node is short, for example, the LOC part is 64 bits, the FUNC is 32 bits, and the ARG is 32 bits.

In some exemplary embodiments, the modification module is further configured to embed the BIFT-ID field into a DA in the IPv6 message; or embed the BIFT-ID field into the SA of the IPv6 message; or fill the BIFT-ID in a Flow Label field of the IPv6 message header, and not modify the DA and the SA in the IPv6 message, that is, the BIFT-ID is filled in the Flow Label field of the IPv6 header, and the SA and DA are not modified. This method is applicable to a scenario in which a BFR-Prefix must be represented by an address of 128 bits.

That is to say, the IPv6 address is divided into two parts, i.e. prefix+BIFT-ID, and when the BIFT-ID field is embedded into the DA in the IPv6 message, an IPv6 routable prefix of a next hop is filled into first 96 bits of the DA, and a BIFT-ID of the next hop is filled into last 32 bits of the DA; and when the BIFT-ID field is embedded into the SA of the IPv6 message, an IPv6 reachable route prefix of a next hop is normally filled into the DA, a prefix of the first 96 bits of the SA is not modified, and only the last 32 bits thereof are modified into a BIFT-ID of the next hop.

In addition, according to a format LOC:FUNCT:ARG defined in draft-ietf-spring-srv6-network-programming, the IPv6 address is divided into three parts: in addition to LOC representing the prefix, a new FUNCT is then defined as a BIER function, and a BIFT-ID is filled in the position of the ARG. When the BIFT-ID field is embedded into the DA in the IPv6 message, a BFR-Prefix of a next hop is filled into the LOC part of the DA, the FUNC is defined as a new function value representing the BIER, and a BIFT-ID of the next hop is filled into the ARG; when the BIFT-ID field is embedded into the SA of the IPv6 message, an IPv6 reachable route prefix BFR-Prefix of a next hop is normally filled into the DA part, and the LOC part of the SA remains unchanged; if the FUNCT part does not represent the function of the BIER, then the FUNCT part is modified to a function value representing the BIER, and a BIFT-ID of the next hop is filled into the ARG part of the SA.

It should be noted that when optimized use of BIFT-ID is performed, in cases where all nodes support unified BFIT-ID optimization means, the control plane does not require special extension. However, if not all the nodes support this function, in order to avoid error processing, a capability advertisement process also needs to be introduced, and a new Type can still be defined by means of the TLV manner as shown in FIG. 4; and support information is carried when information such as a BFR-Prefix following BIER is advertised, that is, these information is carried when advertisement through an IGP or BGP is performed. In this way, the nodes can know each other how other nodes support the function. For example, a new type of sub-TLV or sub-sub-TLV is defined to represent BIFT-ID optimization, and different Types of lower-level sub-sub-TLV or sub-sub-sub-TLV represent different BIFT-ID optimization manners for advertisement; both of them perform advertisement at the same time to indicate support for BIFT-ID optimization, and to specifically indicate the support manner; or only a new type of sub-TLV or sub-sub-TLV is defined to represent BIFT-ID optimization, and the carried Value directly uses 1/2/3 to represent different specific BIFT-ID optimization manners.

In some exemplary embodiments, the modification module is further configured to move forward a forwarding table entry positioning operation of the BIFT-ID in the BIER message header and perform same in the IPv6 message.

In some exemplary embodiments, the modification module is further configured to represent a FUNCTION field of BIER table entry lookup by a specific bit in the IPv6 message address.

It should be noted that the various modules may be implemented by software or hardware. The latter may be implemented in the following manner, but is not limited thereto: all the modules are located in the same processor; or all the modules are located in different processors in any arbitrary combination manner.

Embodiments of the present disclosure further provide a computer-readable storage medium, the computer-readable storage medium storing a computer program, wherein the computer program is configured to execute the steps in any one of the method embodiments when running.

In some exemplary embodiments, the computer-readable storage medium may include, but is not limited to: any medium that can store a computer program, such as a USB flash drive, a Read-Only Memory (ROM for short), a Random Access Memory (RAM for short), a removable hard disk, a magnetic disk, or an optical disc.

Embodiments of the present disclosure further provide an electronic apparatus, including a memory and a processor; wherein the memory stores a computer program, and the processor is configured to run the computer program to execute the steps in any one of the method embodiments.

In some exemplary embodiments, the electronic apparatus can further include a transmission device and an input/output device, wherein the transmission device is connected to the processor, and the input/output device is connected to the processor.

For specific examples in the present embodiment, reference can be made to the examples described in the embodiments and exemplary embodiments, and thus they will not be repeated again in the present embodiment.

It is apparent that a person skilled in the art shall understand that all of the modules or steps in the present disclosure may be implemented by using a general computing apparatus, may be centralized on a single computing apparatus or may be distributed on a network composed of multiple computing apparatuses. The modules or steps may be implemented by using executable program codes of the computing apparatus, and thus, the program codes may be stored in a storage apparatus and executed by the computing apparatus, and in some cases, the shown or described steps may be executed in a sequence different from that shown herein, or the modules or steps are manufactured into integrated circuit modules, or multiple modules or steps therein are manufactured into a single integrated circuit module for implementation. Thus, the present disclosure is not limited to any specific hardware and software combinations.

The content above merely relates to optional embodiments of the present disclosure, and is not intended to limit the present disclosure. For a person skilled in the art, the present disclosure may have various modifications and changes. Any modifications, equivalent replacements, improvements, etc. made within the principle of the present disclosure shall all fall within the scope of protection of the present disclosure.

The invention claimed is:

1. A method for processing a message header, comprising:
processing fields in an IPv6 message header according to fields in a Bit Indexed Explicit Replication (BIER) message header by using at least one of the following manners:
taking the BIER message header as a type of a Routing extension header of the IPv6 message header, and processing a Segments Left field in the IPv6 message header according to a predefined manner;
taking the BIER message header as the type of a Routing extension header of the IPv6 message header, and processing the Segments Left field in the IPv6 message header according to the predefined manner, and taking the BIER message header as a type of other extension headers of the IPv6 message header, wherein the type of the other extension headers include an option as a Hop-by-Hop extension header;
filling a Bit-Forwarding Router Prefix (BFR-Prefix) of the BIER message header in a Source Address (SA) field of the IPv6 message header; and
embedding a Bit Index Forwarding Table Index (BIFT-ID) field in the BIER message header into a target field of the IPv6 message header (S202);
wherein processing the Segments Left field in the IPv6 message header according to the predefined manner at least comprises one of:
setting the Segments Left field as a target value, in order to make all nodes ignore processing on the Segments Left field;
setting a Segments Left field value of a Bit-Forwarding Ingress Router (BFIR) as 255, when an intermediate node forwards a message hop by hop, performing a process of subtracting 1 on the field value, and when the field value is 0, it indicates that a loop occurs in a message forwarding process;
setting, by the BFIR, a Segments Left field value of an ingress node as a maximum hop count of reaching an edge device, when an intermediate node forwards a message hop by hop, performing a process of subtracting 1 on the field value, and when the field value is 0, it indicates that a loop occurs in the message forwarding process;
setting the Segments Left field value of the BFIR as 255, when the intermediate node forwards a message hop by hop, performing a process of subtracting 1 on the field value, and when an IPv6 message of which the Segments Left field value is 255 reaches a Bit Forwarding Egress Router (BFER), calculating the number of hops that the IPv6 message passes through according to a current Segments Left field value; and setting the Segments Left field as a maximum border value of a border to be passed through by the IPv6 message, and when passing through the border, performing a process of subtracting 1 on the field value, and when the field value is 0, it indicates that the message reaches the maximum border and cannot continue to be forwarded to a next area any more;

wherein before filling a BFR-Prefix of the BIER message header in a SA field of the IPv6 message header, the method further comprises:

advertising and collecting, by a control plane, information of transfer capability of the SA field in the IPv6 message header of all the nodes in cases where a node incapable of guaranteeing the transfer capability of the SA field in the IPv6 message header exists in all the nodes.

2. The method for processing a message header according to claim 1, wherein after taking the BIER message header as the type of a Routing extension header of the IPv6 message header, and processing the Segments Left field in the IPv6 message header according to the predefined manner, the method further comprises:

advertising, by a control plane, support of each node itself for taking the BIER message header as the type of a Routing extension header of the IPv6 message header.

3. The method for processing a message header according to claim 2, wherein the method further comprises:

advertising support of each node itself for taking the BIER message header as the type of a Routing extension header of the IPv6 message header by using one of the following manners: performing advertisement in a Type-Length-Value (TLV) manner, carrying the support in BIER information in an Interior Gateway Protocol (IGP) for advertisement, and carrying the support in BIER information in a Border Gateway Protocol (BGP) for advertisement.

4. The method for processing a message header according to claim 2, wherein the method further comprises:

performing advertisement in a sub-Type-Length-Value (TLV) or sub-sub-TLV manner when the support of each node itself for taking the BIER message header as the type of a Routing extension header of the IPv6 message header is set under notification of a BFR-Prefix or a Bit-Forwarding Router Identifier (BFR-ID).

5. The method for processing a message header according to claim 1, wherein after filling a BFR-Prefix of the BIER message header in the SA field of the IPv6 message header, the method further comprises:

setting N bits of other unused fields in the IPv6 message header to 1 when it is confirmed that guarantee capability of the SA field in the IPv6 message header is not supported, in order to indicate that the SA of the IPv6 message header needs to be subjected to guarantee processing, where the value of N is not less than 1.

6. The method for processing a message header according to claim 1, wherein before embedding the BIFT-ID field in the BIER message header into the target field of the IPv6 message header, the method further comprises:

modifying an address in the IPv6 message, in order to set a routable prefix of the IPv6 message in first target number of bits in the IPv6 message.

7. The method for processing a message header according to claim 6, wherein after modifying the address in the IPv6 message, the method further comprises:

embedding the BIFT-ID field into a Destination Address (DA) in the IPv6 message; or embedding the BIFT-ID field into a Source Address (SA) in the IPv6 message; or filling the BIFT-ID in a Flow Label field of the IPv6 message header, and not modifying the DA and the SA in the IPv6 message.

8. The method for processing a message header according to claim 6, wherein the method further comprises:

moving forward a forwarding table entry positioning operation of the BIFT-ID in the BIER message header and performing same in the IPv6 message.

9. The method for processing a message header according to claim 6, wherein the method further comprises:

representing a FUNCTION field of BIER table entry lookup by a specific bit in the IPv6 message address.

10. An apparatus for processing a message header, comprising:

a processor coupled to a memory storing instructions which, when executed, cause the processor to:

process fields in an IPv6 message header according to fields in a Bit Indexed Explicit Replication (BIER) message header by using at least one of the following manners: the BIER message header is taken as a type of a Routing extension header of the IPv6 message header, and a Segments Left field in the IPv6 message header is processed according to a predefined manner; take the BIER message header as the type of a Routing extension header of the IPv6 message header, and process the Segments Left field in the IPv6 message header according to the predefined manner, and take the BIER message header as a type of other extension headers of the IPv6 message header, wherein the type of the other extension headers include an option as a Hop-by-Hop extension header; a Bit-Forwarding Router Prefix (BFR-Prefix) of the BIER message header is filled in a Source Address (SA) field of the IPv6 message header; and a Bit Index Forwarding Table Index (BIFT-ID) field in the BIER message header is embedded into a target field of the IPv6 message header;

wherein the instructions further configure the processor to do at least one of the following:

Set the Segments Left field as a target value, in order to make all nodes ignore processing on the Segments Left field;

Set a Segments Left field value of a Bit-Forwarding Ingress Router (BFIR) as 255, when an intermediate node forwards a message hop by hop, perform a process of subtracting 1 on the field value, and when the field value is 0, it indicates that a loop occurs in a message forwarding process;

Set, by the BFIR, a Segments Left field value of an ingress node as a maximum hop count of reaching an edge device, when an intermediate node forwards a message hop by hop, perform a process of subtracting 1 on the field value, and when the field value is 0, it indicates that a loop occurs in the message forwarding process;

Set the Segments Left field value of the BFIR as 255, when the intermediate node forwards a message hop by hop, perform a process of subtracting 1 on the field value, and when an IPv6 message of which the Segments Left field value is 255 reaches a Bit Forwarding Egress Router (BFER), calculate the number of hops that the IPv6 message passes through according to a current Segments Left field value; and Set the Segments Left field as a maximum border value of a border to be passed through by the IPv6 message, and when passing through the border, perform a process of subtracting 1 on the field value, and when the field value is 0, it indicates that the message reaches the maximum border and cannot continue to be forwarded to a next area any more;

wherein before filling a BFR-Prefix of the BIER message header in a SA field of the IPv6 message header, the instructions further configure the processor to:

advertise and collect, by a control plane, information of transfer capability of the SA field in the IPv6 message header of all the nodes in cases where a node incapable of guaranteeing the transfer capability of the SA field in the IPv6 message header exists in all the nodes.

11. A non-transitory computer-readable storage medium, on which a computer program is stored, wherein when the computer program is executed by a processor, the steps of the method according to claim 1 are implemented.

12. An electronic apparatus, comprising a memory, a processor, and a computer program which is stored on the memory and can be run on the processor, wherein when the processor executes the computer program, the steps of the method according to claim 1 are implemented.

* * * * *